United States Patent Office 3,407,165
Patented Oct. 22, 1968

3,407,165
PROCESS FOR PREPARING SURFACING
COMPOSITIONS AND RESULTING
PRODUCTS
Jacob Oepkes and Hendrikus J. Loois, Delft, Netherlands, assignors to Shell Oil Company, New York, N.Y., a corporation of Delaware
No Drawing. Filed Sept. 18, 1964, Ser. No. 397,603
Claims priority, application Netherlands, Oct. 17, 1963, 299,406
3 Claims. (Cl. 260—29.8)

ABSTRACT OF THE DISCLOSURE

A new process for preparing terrazzo flooring without the need for grinding is disclosed. The process comprises forming a mixture of a curable resin, and a mixture of special coarse fillers and a pulverulent filler. Examples of the curable resins, such as epoxy resins, and examples of the different types of fillers are disclosed. Examples are given as to how to use the process in making terrazzo floors, walls and the like.

---

This invention relates to a new process for preparing surfacing compositions and resulting products. More particularly, the invention relates to a new process for preparing trowellable surfacing compositions which yield a terrazzo layer without the need of subsequent grinding of the surface, and to the new terrazzo layer prepared thereby.

Specifically, the invention provides a new process for preparing terrazzo surfacing compositions which yield layers which do not require subsequent grinding to form a useable surface. The new process comprises forming a mixture of (1) a curable liquid organic resin, and preferably a liquid polyepoxide possessing more than one vic-epoxy group, (2) a coarse filler having a particle size between 0.5 and 5 mm., and (3) a pulverulent filler the particles of which are substantially spherical and have a diameter of less than 0.2 mm. The invention also provides a method for utilizing these compositions to form the desired surface which comprises spreading the composition out on the desired backing, trowelling the mixture to form a smooth surface and then allowing the mixture to harden.

It is known to use sand, ground quartz, ground slate and other ground minerals as a filler in various cement and synthetic resin binder compositions to form terrazzo coatings. In these cases, however, a terrazzo appearance of the surface can only be obtained by grinding and polishing after application of the composition on a backing, and curing, in such a way that particles of the coarse filler show at the surface in a partially ground form. This step of grinding adds considerable cost to the application and consumes considerable time.

It is an object of the invention, therefore, to provide a new process for preparing a trowellable surfacing composition. It is a further object to provide a new process for preparing terrazzo surfaces which gives the desired product without the subsequent grinding operation. It is further object to provide a process for making trowellable surfacing compositions which give hard tough and durable terrazzo surfaces without grinding. It is a further object to provide a new composition for preparing superior terrazzo surfacing compositions. Other objects and advantages of the invention will be apparent from the following detailed description thereof.

It has now been discovered that these and other objects may be accomplished by the new process of the present invention comprising forming a mixture of (1) a curable liquid organic resin, and preferably a liquid polyepoxide possessing more than one vic-epoxy group, (2) a coarse filler having a particle size between 0.5 and 5 mm., and (3) a pulverulent filler the particles of which are substantially spherical and have a diameter of less than 0.2 mm. and preferably spherical particles prepared from a material containing silica, such as glass grains, for example, sifted glass grain fractions with a particle size of between 100 and 200 microns. It has been found that compositions containing this special combination of components can be easily trowlled to form a smooth adhering surface which does not need to be subjected to subsequent grinding to form a useable terrazzo appearing surface. It has been found that in the presence of the special pulverulent particles, the particles of the coarse filler at the surface of the top layer orient themselves largely on trowelling in such a way that a large face of the relevant particle coincides with the surface of the layer, the particles of the pulverulent filler being at the same time smoothed away from the surface.

As noted, the process of the invention comprises forming a trowellable mixture of a curable liquid organic resin, a special coarse filler and a special pulverulent filler. The special pulverulent filler is made up of particles which are substantially spherical and have a diameter of less than 0.2 mm. Use is preferably made of a pulverulent filler with spherical particles prepared from a material containing silica, such as glass grains, for example, sifted glass grain fractions with a particle size of between 100 and 200 microns.

Particularly suitable as a pulverulent filler is one consisting of spherical particles having a hollow nucleus and made from material containing silica and alumina and having a particle size ranging from 50 to 150 microns. Such a filler may be obtained by spraying molten minerals substantially containing alumina and silica, such as types of bauxite or worked-up products thereof, and is very hard and resistant to chemicals. Moreover, the low specific gravity has a very favorable effect on the orientation of the particles of the coarse filler when the present compositions are trowelled.

The coarse filler to be used in the process comprise those fillers having a particle size between 0.5 and 5 mm. Examples of such fillers include chips of marble, granite, porphyrite or wood, chips of synthetic polymers, such as polystyrene, polyvinyl chloride, polyethylene or polypropylene, colored or uncolored, or containing a plasticizer or an elastomer, and the like. Mixtures of such coarse fillers may also be used.

Various curable organic liquid resins may be used in the processes of the present invention. Preferred curable resins are those of the thermosetting type which can be subsequently cross-linked to form a tough, insoluble infusible coating. Examples of these include, among others, unsaturated polyesters alone or in combination with styrene or other monomers, polyurethanes, polycarbonates, polyolefins, polydiolefins, such as polybutadienes and the like, polyepoxides, polyunsaturated polymers, such as those prepolymers derived by polymerizing diallyl phthalate, diacrylate of ethylene glycol and the like.

Preferred polymeric materials to be used include the polyepoxides. These materials are compounds possessing more than one vicinal epoxy group, i.e., more than one

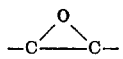

group. These compounds may be saturated or unsaturated, aliphatic, cycloaliphatic, aromatic or heterocyclic and may be substituted with substituents, such as chlorine, hydroxyl groups, alkoxy groups and the like. They may be monomeric or polymeric.

For clarity many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hampseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimalate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tertarate, di(4,5-epoxytetradecyl) maleate, di(2,3-epoxybutyl) azelate, di(3,4-epoxybutyl) citrate, di(5,6-epoxyoctyl) cyclohexane-1,3- dicarboxylate, di(4,5-epoxyoctadecyl) malonate.

Another group of the epoxy-containing materials include those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxyclclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxyclocyohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the liquid glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type.

The above-described organic liquid curable resins are employed in combination with a curing agent. The unsaturated resins, for example, are used in combination with peroxide catalysts, and the polyurethanes are used in combination with agents, such as water, etc., which furnish a replaceable hydrogen.

The preferred polyepoxides can be cured with a variety of substances which may be preferably of the alkaline or acid-type. Suitable curing agents include the amino compounds, such as triethylamine, ethylene diamine, diethylamine, diethylene triamine, triethylene tetramine, pyridine, piperidine, N,N'-diethyl-1,3-propanediamine, dicyandiamide, melamine, fatty acid salts of amines and the like, and condensates of the polyamines with oxides, unsaturated esters or unsaturated nitriles. Other examples include the polycarboxylic acids or anhydrides, such as phthalic anhydride, terephthalic acid, chlorendic anhydride, octadeceylsuccinic anhydride, dodecylsuccinic anhydride, tetrahydrophthalic anhydride, dimerized linoleic acid, trimerized linoleic acid, adipic acid, succinic acid, inorganic acids such as phosphoric acid and acid esters, boric acid and the like. Other curing agents include the polyamides such as may be obtained by reacting the above-noted polyamines and polycarboxylic acids together. The resulting products may be amino or carboxyl terminated. Other curing agents include the polymercaptans, the metal salts, hydrazines, and the like.

The amount of the curing agent employed will vary over a wide range depending upon the type of agent selected. In case of those having active hydrogen, the amount of agent will preferably vary from about .8 to 1.5 equivalents per equivalent of epoxide. In case of the tertiary amines, metal salts and the like, the amount of agent will preferably vary from about .1% to about 10% by weight of the polyepoxide to be cured.

It is also desirable in some cases to employ accelerators for the cure. In case of the polyepoxides, suitable accelerators include the monohydric and polyhydric phenols, tertiary amines, amine salts, phosphines, mercaptans, sulfide and the like. These are generally employed in amounts varying from about .01% to about 5% by weight of the polyepoxide.

Flexibilizing agents, plasticizers, extenders and additives may also be added to the compositions of the invention. Suitable extenders or plasticizers include pine oil, furfuryl alcohol, coal tar, refined coal tar, coal tar pitch, middle oil, asphaltic bitumen and petroleum products, such as aromatic lubricating oil extracts and the like.

The preferred extenders to employ include the bituminous materials. Such materials include substances containing bitumens or pyrobitumens, pyrogeneous distillates and tar, pyrogeneous waxes and pyrogeneous residues (pitches and pyrogeneous asphalts). They are preferably composed mainly of hydrocarbons although they may contain amounts of sulfur, nitrogen and oxygen-containing materials. They also are preferably fusible and largely soluble in carbon disulfide. Examples of such bituminous materials may be found in Abraham's "Asphalts and Allied Substances," Vol. I, page 57, 5th Edition.

An especially preferred group of bituminous materials to be used in the compositions of the invention include the asphalts. These asphalts may be naturally occurring asphaltic material, such as Gilsonite or petroleum derived, such as straight run, blown, cracked and catalytically or non-catalytically polymerized asphalts. All such asphalts are useful regardless of their original penetrations or softening points.

Especially preferred are the straight run asphalts used for paving, such as those having penetrations between 40 and 300 and softening points within the range from about 145° F. to about 95° F. Blown asphalts are normally produced in the presence or absence of catalysts by blowing asphalts or fluxes at elevated temperatures with an oxygen-containing gas such as air. Typical blown asphalt may have a softening point range of between about 300° F. and about 120° F. and a penetration within the range from about 100 to 0.

Aromatic asphalts, such as those comprising the bottoms products from the distillation of catalytically cracked gas oil, are also preferred.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrobenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

Also preferred are the products derived from coal such as coal tars, refined coal tars and coal tar pitches, and preferably those having a softening point below 190° F. and a solubility in carbon disulfide of at least 50%. The expression "tar" as used herein refers to products obtained in connection with the destructive distillation of coal. When part of the volatile material is removed, the residue is called "refined coal tar." When additional volatile material is removed, the residue is termed "coal tar pitch." Residuals having a fusing point below about 90° F. are referred to herein as refined coal tars while those having fusing points of 90° F. or above are coal tar pitches. As used herein, in reference to coal tar products, "softening point" or "fusing point" refers to values obtained by the cube method as described in vol. II, Abraham, "Asphalts and Allied Substances," 5th Edition. The coal products should possess at least 50% and preferably 75% solubility in carbon disulfide. The coal tar, refined coal tar and coal tar pitch may be acidic, basic or neutral, depending on whether the acid and/or basis have been removed. These coal products may be obtained from various types of bituminous coals, such as, for example, cannel, bog-peat, carbonite, and the like, and may be derived from various processes, such as from gas works, coke ovens, blast furnaces, gas producers and various low temperature processes. Description of examples of various coal tars, refined coal tars and coal tar pitches may be found on pages 384 to 405 of Abraham, "Asphalts and Allied Substances."

Particularly preferred coal derivatives to be used in preparing the compositions of the present invention include the residuals resulting from distillation of coal tar, and preferably refined coal tars having a fusing point of below 70° F. and a solubility in carbon disulfide of at least 75% with a specific gravity of 1.10 and 1.50, and low melting coal tar pitches having a fusing point below 120° F. and a solubility in carbon disulfide of at least 75%.

Coloring materials and pigments may also be incorporated in the present compositions.

The compositions of the present invention may be prepared by any suitable method. The compositions may be prepared, for example, by simply mixing the components together in any order with or without the application of heat. As the compositions prepared from the liquid organic resins have sufficiently low viscosity, a trowellable composition is obtained directly without the addition of diluents or solvents or generally without the application of heat. However, if desired or necessary one may employ heat or add small amounts of diluents or solvents such as hydrocarbons as benzene, xylene, cyclohexane and the like, or reactive diluents, such as butyl glycidyl ether, phenyl glycidyl ether, and the like, or fluid polyepoxides, such as glycidyl ether of glycerol, glycidyl ether of ethylene glycol and the like.

The ratio of curable organic liquid (which latter, in the scope of the present invention, also includes curing agents, flexibilizers, plasticizers and the like), coarse filler and pulverulent filler having spherical particles, may be varied within wide limits. The volume of curable liquid and pulverluent filler together may be smaller than the free volume of the coarse filler in bulk, for example, for the manufacture of porous terrazzo surface layers. Preferably, however, the curable liquid and pulverulent filler together are used in a volume greater than the free volume of the coarse filler in bulk. The ratio of the volume of curable liquid to the sum of the volume of both types of fillers in bulk is preferably greater than 1:9, preferably between 1:6 and 1:4, for example, 1:5.5 (when marble chips are used as coarse filler) or 1:4.5 (when polyvinyl chloride chips are use as coarse filler).

The ratio of the volumes of pulverulent filler to coarse filler (both in bulk) may likewise be varied within wide limits, for example between 0.6:1 and 2.5:1, but is preferably kept between 0.7:1 and 1.5:1.

The present compositions may be applied to a large variety of backings, for example, to wood, concrete, stone, iron, fibre board and foam board of, for example, polystyrene or polyurethane. When they are applied to a porous backing such as wood, concrete, foam board or fibre board, absorption of liquid by the backing may be suppressed by first wetting the backing with a curable liquid without filler.

The compositions according to the invention may be applied to floors and walls, and both to flat and curved surfaces. They are preferably applied by spreading them in a layer having a thickness of, for example, 4–6 mm. The surface layer is subsequently allowed to harden, a smooth, hard surface layer with attractive terrazzo appearance being obtained. If desired, the surface may be treated with a polishing agent in order to remove any slight irregularities. In most cases, however, subsequent polishing is superfluous; with surface layers on floors the skid resistance is often better when there is no polishing. If desired, the fully cured surface layers may be treated with a small quantity of colored lacquer or paint, whereby very attractive color effects may be obtained.

The compositions may be cured by following the conventional procedure for curing the selected type of organic resin. When heating is desirable, the application may be accomplished by heating the fillers or other components before addition to the composition or by use of heat lamps and the like. In case of the polyepoxides, when active curing agents, such as the aliphatic or cycloaliphatic amines are employed, the compositions will cure at ambient temperature. However, higher temperatures may be used to accelerate the cure. When the curing agent is an aromatic amine, acid or polybasic acid anhydride, heat is generally preferred. Temperatures employed for this and other curves will preferably vary from about 50° C. to about 175° C. However, higher or lower temperatures may be used as necessary.

In case of the unsaturated polyesters, temperatures utilized will be those close to the decomposition temperature of the peroxide catalyst. In most cases, the temperature will vary from about 20° C. to about 150° C.

The invention is illustrated by some examples. The parts referred to therein are parts by weight. The curable organic liquid in these examples was a polyepoxide composition of the following formulation:

| | Parts |
|---|---|
| Polyglycidyl ether of 2,2-di(4-hydroxyphenyl) propane with an epoxy equivalent weight of 200 | 75 |
| Pine oil | 20 |
| Phenol | 5 |
| Diethylene triamine per 100 parts of polyepoxide composition used as curing agent | 10 |

EXAMPLE I 164 parts of the above-mentioned polyepoxide composition were mixed with 157 parts of pulverulent filler which contained approximately 45% of alumina and 55% of silica, the particles of which were spherical with a hollow nucleus and had a particle size of from 50 to 150 microns, which filler had a bulk density of 0.42 kg./ml., a specific gravity of 0.71 g./ml. and a hardness (Mohrs) of 8.3. 16.4 parts of diethylene triamine, 187 parts of white polyvinyl chloride chips and 94 parts of black polyvinyl chloride chips, the latter two having a particle size of 0.6–2.0 mm., a specific gravity of 1.4 and a bulk density of 0.9 g./ml., were subsequently added. The mixture was trowelled on to a polystyrene foam board, which had previously been wetted with a mixture of the above-mentioned polyepoxide composition with curing agent without filler and was spread out in a 5 mm. thick layer. This layer, which had an attractive terrazzo-appearance without further treatment, was hard after 3 hours, and usable after one night.

EXAMPLE II 50 parts of the above-mentioned polyepoxide composition were mixed with 225 parts of glass grains (particle size 130–170 microns, bulk density 1.8 g./ml.), 5 parts of diethylene triamine and 100 parts of white polyvinyl chips as described in Example I. The mixture was applied to a concrete floor which had been wetted with the same polyepoxide composition with curing agent but without filler, and was spread out with a trowel in a 5 mm. thick layer. This layer had a terrazzo-appearance without further treatment and was usuable after one night.

EXAMPLE III 66 parts of the above-mentioned polyepoxide composition were mixed with 62.5 parts of the pulverulent filler described in Example I, 6.6 parts of diethylene triamine and 25 parts of marble chips (particle size 1.0–2.0 mm.; bulk density 1.2 g./ml.). The mixture was applied to a concrete floor, as in Example II, and spread out with a trowel in a 5 mm. thick layer. This layer had an attractive terrazzo-appearance, without further treatment, and was usable after one night.

EXAMPLE IV

Examples I to III are repeated with the exception that the pine oil is replaced with dinonyl phenol. Related results are obtained.

EXAMPLE V

Examples I to III are repated with the exception that the diethylene triamine is replaced with each of the following: N-aminoethyl-piperazine, 1,4 - diaminocyclohexane, triethylene tetramine and 2,6 - diaminopyridine. Related results are obtained in each case.

EXAMPLE VI

Examples I to V are repeated with the exception that the glycidyl polyether is replaced with each of the following: mixture of glycidyl ester of trimerized linoleic acid and the above-noted glycidyl ether of 2,2-bis(4-hydroxyphenyl)propane, glycidyl ether of a novolac resin (i.e., phenol-formaldehyde resin), glycidyl ether of resorcinol and N,N-diglycidyl aniline. Related results are obtained in each case.

EXAMPLE VII

Examples I to III are repeated with the exception that the pine oil is replaced with each of the following: coal tar pitch, refined coal tar, middle oil, aromatic lubricating oil extract, and an Edeleanu petroleum extract having the following properties: gravity, °API 5.8; flash, Coc. 415° F.; viscosity, SSU at 210° F. 611; aniline point, 81° F.; acid No. 0.05; and iodine No. 69. Related results are obtained.

EXAMPLE VIII

A trowellable coating composition is prepared from an unsaturated polyester by the following technique.

48 parts of a polyester prepared by reacting propylene glycol with a mixture of phthalic anhydride and maleic anhydride and containing styrene (10%), is mixed with 10 parts of a polyester prepared by reacting ethylene glycol with maleic anhydride. To this mixture is added 41.2 parts of styrene, .8 part cobalt naphthenate, .8 part wax, 1.0 part methyl ethyl ketone peroxide.

To the above mixture is added 100 parts of a pulverulent filler as described in Example I and 100 parts of black polyvinyl chloride chips as noted in Example I. This mixture is trowelled on a polyurethane foam board, which has previously been wetted with the above-noted polyester mixture to form a ¼ inch layer. This layer, which has an attractive terrazzo-appearance without further treatment, is hard after several hours and is usable after one night.

We claim as our invention:

1. A process for the preparation of trowellable surfacing composition which when applied to a backing yields a terazzo layer without subsequent grinding treatment, which comprises forming a mixture of (1) a curable liquid organic resin, (2) a coarse filler having a particle size between 0.5 and 5 mm., ad (3) a pulverulent filler which is made up of spherical particles having a hollow nucleus and made from material containing silica and alumina, and having a particle size ranging from 50 to 150 microns, the ratio of the volume of the curable liquid to the sum of the volumes of both types of fillers is greater than 1:9, and the ratio of the volume of the pulverulent filler to coarse filler is between 0.6:1 to 2.5:1.

2. A process for the preparation of a trowellable surfacing composition which when applied to a backing yields a terrazzo layer without subsequent grinding treatment, which comprises forming a mixture of (1) a curable liquid organic resin, (2) a coarse filler comprising colored polyvinyl chloride chips having a particle size between 0.5 and 5 mm. and (3) a pulverulent filler the particles of which are substantially spherical and have a diameter of less than 0.2 mm., the ratio of the volume of the curable liquid to the sum of the volumes of both types of fillers is greater than 1:9, and the ratio of the volume of the pulverulent filler to coarse filler is between 0.6:1 to 2.5:1.

3. A process for making a trowellable composition comprising forming a mixture of a glycidyl ether of 2,2-bis(4-hydroxyphenyl) propane, pine oil, phenol, diethylene triamine with a pulverulent filler containing 45% alumina and 55% silica, the particles of which are spherical and having a particle size of 50 to 150 microns, and coarse filler comprising polyvinyl chloride chips having a particle size of 0.6 to 2.0 mm., the ratio of the volume of the glycidyl ether to the sum of the volumes of both types of fillers is greater than 1:1, and the ratio of the volume of the pulverulent filler to coarse filler is between 0.6:1 to 2.5:1.

References Cited

UNITED STATES PATENTS

| | | | |
|---|---|---|---|
| 2,897,733 | 8/1959 | Shuger | 260—40 |
| 3,132,115 | 5/1964 | Pschorr et al. | 260—29.8 |
| 2,861,895 | 11/1958 | Hardman | 260—28 |
| 2,952,192 | 9/1960 | Nagin | 94—1.5 |
| 3,005,790 | 10/1961 | Wynn et al. | 260—40 |
| 3,008,387 | 11/1961 | Wittenwyler et al. | 94—22 |
| 3,033,088 | 5/1962 | Wittenwyler | 260—37 |
| 3,174,977 | 3/1965 | Hoiberg et al. | 94—3 |

MORRIS LIEBMAN, *Primary Examiner.*

B. A. AMERNICK, *Assistant Examiner.*